United States Patent Office 3,835,025
Patented Sept. 10, 1974

3,835,025
PROCESS FOR THE PRODUCTION OF HIGH PURITY NORMAL PARAFFINS
Max Kunert, Neu-Wulmstorf, and Lothar Sandhack, Rheurdt, Germany, assignors to Deutsche Texaco Aktiengesellschaft, Hamburg, Germany
No Drawing. Filed Apr. 25, 1973, Ser. No. 354,283
Claims priority, application Germany, Apr. 27, 1972, P 22 20 621.9
Int. Cl. C07b *21/00;* C10g *43/04*
U.S. Cl. 208—25                                10 Claims

ABSTRACT OF THE DISCLOSURE

High purity n-paraffins are produced in a urea dewaxing process incorporating a repulping step wherein the repulping of a powdery adduct is conducted at a temperature above the adduct forming temperature but below the adduct decomposition temperature followed by cooling the mixture to the adduct forming temperature.

BACKGROUND OF THE INVENTION

It is known to react mineral oil distillates with urea to produce crystalline n-paraffin-urea inclusion compounds, called adducts, and to remove these adducts from the mineral oil filtrate by filtration, screening, or centrifugation. The recovered adducts are then washed with organic solvents and decomposed by heating to a higher temperature, normally to about 85° C., whereby crude normal paraffins are obtained and the urea charge is recovered. The mineral oil filtrate has a lower pour point owing to the reduced n-paraffin content and is therefore a suitable component for lubricating, fuel and diesel oils, and for other purposes. Although the crude normal paraffin stream obtained according to the embodiments of this known urea dewaxing process contain mostly n-paraffins of various chain lengths, it also contains, depending on the composition of the mineral oil distillate and the dewaxing conditions employed, from about 10 to 20 weight percent or more of non-paraffinic hydrocarbons which act as melting point depressors in the normal paraffin product, thus reducing the sales value thereof.

There are a large number of known modifications and improvements to the above described fundamental embodiment of the urea dewaxing process, which are intended to increase the selectivity of the process. Usually, the objective is to obtain either a low pour mineral oil raffinate or a high purity normal paraffin product with a relatively high melting point or melting point range. It has also been proposed to produce pure n-paraffins and low pour mineral oils simultaneously, by a multi-stage urea dewaxing process. In practice, it is usually preferable to dewax the charge oil as required with urea and to purify the crude normal paraffin stream thus obtained in a separate operation, e.g. by recrystallization with suitable solvents, and the like.

However, there are also other urea dewaxing processes which form an adduct low in oil content which, upon decomposition, yields pure n-paraffins. For example, French Pat. No. 1,408,798 discloses a process in which the mineral oil is initially reacted with only a portion of the amount of urea necessary for removing the n-paraffins. This first adduct fraction contains n-paraffins with a very low oil content.

According to German Auslegeschrift 1,470,547, relatively pure n-paraffins can be obtained by adding n-paraffins, which may be recycled from a previous adduct decomposition step, to the charge oil prior to reacting the mineral oil charge with an amount of urea sufficient to achieve complete separation of the n-paraffins.

According to still another process disclosed in German Pat. No. 1,105,090, an oil poor adduct is produced by preparing, first, a coarse-grained adduct which is readily separated from the mineral oil filtrate by screening and easily washed with oil solvents. Since the n-paraffin contained in the coarse-grained adducts still contains about 20 wt. percent of oily constituents, this prior art process provides for converting the coarse-grained adduct, after washing, in a second stage into a fine-crystalline/powdery adduct which is mixed by stirring with a wash agent of greater specific gravity than the adduct. Finally, the adduct is removed from this dispersion by centrifugation and decomposed by standard methods. Optionally, the mixing of the powdery adduct, which is known in the art as "repulping", may be repeated several times, but is conducted at a temperature not exceeding the adduct-forming temperature and, advantageously, below the temperature limit for forming a fine grained adduct. According to German Pat. No. 1,105,090, for example, an adduct produced from spindle oil and aqueous urea solution saturated at 70° C. is digested with the wash solvent at a temperature of 20° C. or lower. As described in German Pat. No. 1,098,657, a temperature higher than this will impart a coarse-grained structure to the adduct. However, a coarse-grained adduct tends to conglomerate and cake and is less suitable for recovering pure n-paraffins.

It is the object of the present invention to simplify these known processes and to provide a process for the removal and recovery of very pure, that is, nearly oil-free, n-paraffins from mineral oil distillates.

SUMMARY OF THE INVENTION

Extremely high purity n-paraffins are produced in a urea dewaxing process wherein a powdery adduct is formed in the adduct forming step and then treated with additional solvent in a repulping step at a temperature above the adduct forming temperature but below the adduct decomposition temperature. This mixture is then cooled to the adduct forming temperature to reform the powdery adduct which is recovered from the mixture and decomposed to produce the high purity n-paraffins.

DESCRIPTION OF THE PREFERRED EMBODIMENTS

This invention relates to a process for the production of pure n-paraffins comprising reacting a mineral oil distillate with urea or with an aqueous urea solution, saturated at an elevated temperature, in the presence of organic solvents at a relatively low aduct-forming temperature; separating the washed adducts from the wash liquid and recovering the pure n-paraffins by decomposition of the adducts or by extraction of the adducts with a solvent at an elevated temperature. Specifically, this invention is directed to improvements in the urea dewaxing process, including reacting, at a temperature of about 20 to 40° C., the mineral oil distillate which has been diluted with an organic solvent or solvent mixture with urea or with an aqueous urea solution saturated at a temperature above 40° C. to form a finely crystalline, powdery adduct, treating the washed powdery adduct with fresh solvent at a temperature higher than the adduct-forming temperature but lower than the decomposition temperature in what is termed the repulping step, cooling the mixture to the adduct-forming temperature, then recovering the powdery adduct from the mixture and decomposing the powdery adduct to yield pure n-paraffins as a product from the process. We find that a temperature of 20 to 40° C. is useful as the adduct-forming temperature and while the repulping step is conducted at a temperature above the adduct forming temperature and below the decomposition temperature, a temperature in the range of about 40 to 60° C., is preferred.

This process is based on the production of a finely crystalline/powdery adduct, hereinafter referred to as powder adduct. The process conditions to be observed for obtaining powder adduct are known from German Pat. No. 1,098,657. For example, the reaction of 100 parts by volume of a mineral oil distillate boiling in the range of from 307 to 415° C. with 100 parts by volume of an aqueous urea solution saturated at 70° C. and 300 parts by volume of dichloromethane (DCM) as solvent yields a powder adduct, if the adduct-forming temperature is below 270° C.

If the reaction is conducted with the same volume of hexane or isopentane instead of DCM, an adduct-forming temperature of below 8° C. is required to obtain powder adduct. If these solvents are replaced by such solvents as methanol, ethanol, acetone, butanone, methyl formate or methyl acetate, a sticky, non-pumpable adduct is formed in the range of between 20 and 40° C. Powder adduct is obtained only at temperatures substantially lower than when using DCM or $C_5-C_6$ hydrocarbons. The use of higher boiling solvents such as methylisobutylketone, butyl acetate, hexanol or the like, as solvents in the adduct-forming process produce very viscous emulsions which can be neither pumped nor filtered. While all these solvents permit the production of powder adduct at very low adduct-forming temperatures, this mode of operation is not economically feasible because of the high cooling costs. Although it is possible with DCM to produce powder adduct in a desirable temperature range, the powder adduct cannot be continuously separated by centrifugation due to the small difference between the densities of the adduct and the DCM containing liquid phase.

However, it has been found that powder adduct can be obtained in an economically feasible temperature range of from about 20 to 40° C. by using a solvent mixture of about 65 to 95 vol. percent of $C_5-C_6$ hydrocarbons such as isopentane, hexane or benzene as solvents and about 35 to 5 vol. percent of higher boiling compounds, preferably methylisobutylketone. Further, it has been found that the powder adduct can be removed surprisingly well from the mineral oil filtrate and the solvent mixture used for washing by centrifuging. In view of German Pat. No. 1,105,090, this result was unexpected since the solvent mixture was of lower specific gravity than the powder adduct. Consequently, the separation of the powder adduct from the mineral oil raffinate (primary filtrate), the washing of the adduct with liquid solvent and also the treatment of the washed adduct, particularly with vaporous solvent, may be carried out in a commercial separator, such as a full jacket centrifuge. This may include centrifuging the primary filtrate in a first section of the centrifuge, washing the adduct with fresh solvent in a second section, and, finally in a third section of the centrifuge, treating the washed adduct with warm solvent, preferably by introducing solvent vapors that at least partially condense thereby heating the adduct to a temperature in the range of between about 40 and 60° C. The repulping mixture consisting of powder adduct and liquid solvent is transferred from the third section of the centrifuge to a reaction vessel and recooled to the adduct-forming temperature of about 20 to 40° C. Advantageously, this step of recooling is carried out either directly, by evaporating appropriate amounts of liquid butane or the like, or indirectly.

It should be noted that the solvent mixtures of this invention have the additional advantage of being much less expensive and completely non-corrosive.

The process of the present invention is further illustrated by the following examples:

EXAMPLE I

In this comparison example, a light gas oil boiling in the range of from about 210 to 315° C. (corresponding to hydrocarbons with about 12 to 22 carbon atoms) and comprising about 16 wt. percent n-paraffins, is used. For each test run, 100 parts by volume of this gas oil are mixed with 330 parts by volume of a solvent mixture consisting of 300 parts by volume of hexane or benzene and 30 parts by volume of methylisobutylketone (MIBK). In each instance, 430 parts by volume of this gas oil-solvent mixture are reacted with 90 parts by volume of an aqueous urea solution, saturated at 70° C., at a temperature of 30° C. A fine powdery adduct having a medium particle size of below 0.1 mm. is obtained. In the Tables, this so-called "powder adduct" is designated by "P." The adduct is filtered and washed with 330 parts by volume of fresh solvent mixture per 100 parts by volume of gas oil charge.

In Run 1, the washed adduct is stirred vigorously at 30° C. with 330 parts by volume of fresh solvent mixture per 100 parts by volume of gas oil charged ("the repulping" process according to German Pat. No. 1,105,-090). In Runs 2 to 6, this "repulping" treatment is carried out at temperatures of 40 and 60° C. (3 min. each), respectively, then the adduct is refiltered at these temperatures and, subsequently, decomposed at a temperature of up to 85° C. with the addition of water. The solvent mixture is evaporated from the n-paraffin phase obtained. The n-paraffin content of the n-paraffin product is determined. The results of these runs are shown in Table I below.

TABLE I

| Run number | 1 | 2 | 3 | 4 | 5 | 6 |
|---|---|---|---|---|---|---|
| Gas oil charge, parts by volume | 100 | 100 | 100 | 100 | 100 | 100 |
| Aqueous urea sol., 70° C. saturation, parts by volume | 90 | 90 | 90 | 90 | 90 | 90 |
| 1st solvent, parts by volume | ¹300 | ¹300 | ¹300 | ¹300 | ²300 | ²300 |
| 2d solvent, (MIBK) parts by volume | 30 | 30 | 30 | 30 | 30 | 30 |
| Adduct-forming temperature, °C | 30 | 30 | 30 | 30 | 30 | 30 |
| Form of adduct | P | P | P | P | P | P |
| Repulping temp., °C | 30 | 40 | 50 | 60 | 50 | 60 |
| n-Paraffin yield, wt. percent (basis gas oil charge) | 13.7 | 9.2 | 6.9 | 3.9 | 8.2 | 6.3 |
| n-Paraffin yield, wt. percent (basis n-paraffin charge) | 85.7 | 57.5 | 43.2 | 24.4 | 51.3 | 39.4 |
| Purity of n-paraffins, wt. percent | 97 | 98.5 | 98.7 | 98.8 | 98.6 | 98.8 |

¹ Hexane. ² Benzene.

The six comparative test runs show that it is possible to improve the purity of the n-paraffin product by raising the repulping temperature (from 30 to 40–60° C.). This is accompanied, however, by a considerable reduction in the n-paraffin yield based upon the n-paraffin content of the gas oil charge.

EXAMPLE II

The mode of operation of Example I is repeated in Runs 7 to 12, with the following modifications:

(a) 100 parts by volume of the gas oil charge is mixed with 330 parts by volume of a mixture of 300 parts by volume of hexane or benzene and 30 parts by volume of MIBK. The urea was either 90 parts by volume of an aqueous urea solution with 70° C. saturation (Runs 7 to 10) or 67 grams by weight of crystalline urea (Runs 11 to 12), per every 100 ml. of gas oil charge.

(b) The adduct-forming temperature is 25° C., (c) The repulping treatment in comparative Runs 7, 9 and 11 is carried out in each instance at 25° C., and (d) Runs 8, 10 and 12, illustrating the invention, the repulping treatment at 60° C. is followed by a re-adductionation at 25° C. with a residence time of 5 min.

The results of Runs 7, 9 and 11 performed for comparative purposes and of Runs 8, 10 and 12 performed according to the invention are shown in Table II below.

TABLE II

| Run number | 7 | 8 | 9 | 10 | 11 | 12 |
|---|---|---|---|---|---|---|
| Gas oil charge, ml | 100 | 100 | 100 | 100 | 100 | 100 |
| 1st solvent, ml | [1] 300 | [1] 300 | [2] 300 | [2] 300 | [2] 300 | [2] 300 |
| 2d solvent, (MIBK) ml | 30 | 30 | 30 | 30 | 30 | 30 |
| Urea charge, aqueous solution saturated at 70° C., ml | 90 | 90 | 90 | 90 | 90 | |
| Urea charge, crystalline urea, g | | | | | 67 | 67 |
| Adduct-forming temperature, ° C | 25 | 25 | 25 | 25 | 25 | 25 |
| Form of adduct | P | P | P | P | P | P |
| Repulping temp., ° C | 25 | 60 | 25 | 60 | 25 | 60 |
| Readductionation temperature, ° C | | 25 | | 25 | | 25 |
| n-Paraffin yield, wt. percent (of gas oil charge) | 13.0 | 12.3 | 15.0 | 13.9 | 15.0 | 14.0 |
| n-Paraffin yield, wt. percent (of n-paraffin charge) | 81.3 | 76.9 | 93.8 | 87.0 | 93.8 | 87.5 |
| Purity of n-paraffins, wt. percent | 97.0 | 99.1 | 97.0 | 99.2 | 97.0 | 99.3 |

[1] Hexane. [2] Benzene.

It is shown here that performing the process according to the invention (Runs 8, 10 and 12) produced, in all instances, an n-paraffin purity of more than 99 wt. percent. The n-paraffin yield, based on both the total gas oil charge and the 16 wt. percent n-paraffin content of the charge, is not substantially lower in Runs 8, 10 and 12, performed according to the invention than in the comparative runs.

EXAMPLE III

Repeating the procedure of Example II, 100 parts by volume of gas oil boiling in the range of 210 to 315° C., are diluted with 180 parts by volume of isopentane and 20 parts by volume of MIBK and reacted with 60 parts by volume of aqueous urea solution saturated at 70° C. The adduct-forming temperature is adjusted to 20° C. and a powder adduct is obtained, which is washed with 200 parts by volume of the same solvent mixture. A portion of the washed adduct is vigorously stirred for 10 minutes with fresh solvent mixture (280 parts by volume per 100 parts by volume of adduct) at 20° C. Then, the adduct is again separated and decomposed, yielding a product containing 96.5 wt. percent of n-paraffin.

The remaining portion of the washed adduct is mixed with 200 parts by volume of the same isopentane-MIBK mixture per 100 parts by volume of adduct, and heated to 50° C. for three minutes under strirring, whereafter it is immediately cooled to 20° C. by admixing liquid butane and with stirring maintained 5 minutes at that temperature. After separation and decomposition of the powder adduct a product containing 98.8 wt. percent of n-paraffin is obtained.

EXAMPLE IV

Example III is repeated using a gas oil distillate cut boiling in the range of from 275 to 315° C., while maintaining the other operating conditions.

The repulping treatment of the adduct at 20° C. yielded a product with an n-paraffin content of 97 wt. percent. The repulping treatment at 50° C. according to the invention and subsequent readductionation at 20° C. yielded a product containing 99.0 wt. percent of n-paraffins.

EXAMPLE V

Example III is repeated using 100 parts by volume of a "spindle oil O" boiling in the range of between 317 and 420° C., dissolved in 180 parts by volume of hexane and 20 parts by volume of MIBK, and 50 parts by volume of aqueous urea solution (saturation temperature 70° C.). The adduct-forming temperature is 35° C. Powder adduct is obtained.

A repulping treatment at 35° C. yielded a paraffin with an n-paraffin content of 97.0 wt. percent. The treatment of the washed adduct with the solvent mixture (3 min. at 60° C.) and readductionation at 35° C. (5 min. residence time) resulted in a paraffin containing 98.6 wt. percent of n-paraffins.

EXAMPLE VI

The treatment of the washed adduct according to the procedure of Examples III–V is modified by causing vapors of the solvent mixture, having a temperature of between 80 and 120° C., to contact the adduct and condense to produce the indicated treating temperature. Recovering the n-paraffin from the adducts treated in this fashion produces substantially the same degree of purity for the n-paraffin as is obtained in Example III–V where the solvent mixture is employed in liquid form.

EXAMPLE VII

The adduct-forming mixture of Example V, formed from spindle oil O boiling in the range of about 317 to 420° C. and containing 15 wt. percent of adductible n-paraffins plus solvent mixture and aqueous urea solution, is separated into a powder adduct (specific weight 1.23 g./ml.) and a mineral oil filtrate (specific weight 0.69 g./ml.), in a full jacket centrifuge (Type D1-SDA, manufactured by Westfalia Separator AG, Oelde). The centrifuge is run at a drum speed of 4000 to 5500 r.p.m. and a screw exceeding the drum speed by 60 r.p.m. A sample of the unwashed adduct is decomposed, yielding a crude n-paraffin product with an oil content (ASTM) of 5.1 wt. percent, corresponding to an n-paraffin content of about 90 wt. percent.

After removal of the filtrate, the adduct is washed in the conical section of the separator screw, with a total of 20 parts by volume (based on the adduct) of fresh solvent (90 volume percent of isopentane and 10 volume percent of MIBK). After that, the adduct is centrifuged to remove the wash agent, leaving a residual 10 wt. percent of the wash agent. A portion of the washed adduct is subjected to decomposition, yielding a crude n-paraffin product containing about 94 wt. percent of n-paraffin.

The remaining portion of the washed adduct is heated for 5 min. to 50° C. in the drying zone of the separator by introducing hot solvent vapors which condense in the drying zone. Immediately thereafter, the adduct-solvent mixture is transferred to an adduct-forming vessel, cooled to 20° C. by adding liquid butane under stirring, maintained at that temperature for 5 minutes and again separated by centrifugation. The separated adduct is decomposed at about 85° C. with the addition of water. A n-paraffin product with an oil content (ASTM) of 1.9% (corresponding to an n-paraffin content of about 98 wt. percent) is obtained. A sample of the adduct, washed and treated with solvent vapors at 50° C., obtained prior to cooling to 20° C., yielded a product having an n-paraffin content of 96.7 wt. percent.

We claim:

1. In a process for the production of n-paraffins comprising reacting a mineral oil distillate admixed with an organic solvent with urea or a urea solution, saturated at an elevated temperature, to form solid n-paraffin-urea adducts; separating the solid adducts from the solvent-containing mineral oil filtrate; washing the adducts with fresh organic solvent, at a temperature not exceeding the adduct-forming temperature; separating the washed adducts from the wash liquid and recovering the n-paraffins from the washed adduct by decomposition of the adducts or by extraction of the adducts with a solvent at elevated temperature, the improvement which comprises:

(a) reacting the admixture of mineral oil distillate and organic solvent with urea selected from the group consisting of crystalline urea and aqueous urea solution at an adduct-forming temperature sufficient to produce a finely crystalline, powdery adduct, (b) subsequent to (1) separating the adduct from the solvent-containing mineral oil mixture, (2) washing the adduct with fresh organic solvent and (3) separating the adduct from the wash solvent and prior to recovering the n-paraffins from the washed adduct,
  (i) repulping the washed, powdery adduct with fresh organic solvent by contacting said adduct with said solvent at a temperature above the adduct forming temperature and below the adduct decomposition temperature,
  (ii) cooling the repulping mixture to the adduct-forming temperature producing finely crystalline, powdery adduct and
  (iii) separating the powdery adduct from the cooled repulping mixture.

2. A process according to Claim 1 wherein the organic solvent is a mixture of about 65 to 95 volume percent of a $C_5$–$C_6$ hydrocarbon and about 35 to 5 volume percent of a higher boiling organic compound.

3. A process according to Claim 2 wherein the $C_5$–$C_6$ hydrocarbon is isopentane and the higher boiling organic compound is methylisobutylketone.

4. A process according to Claim 2 wherein the $C_5$–$C_6$ hydrocarbon is hexane and the higher boiling organic compound is methylisobutylketone.

5. A process according to Claim 2 wherein the $C_5$–$C_6$ hydrocarbon is benzene and the higher boiling organic compound is methylisobutylketone.

6. A process according to Claim 1 wherein the adduct forming temperature is between about 20 and 40° C. and the adduct decomposition temperature is about 85° C.

7. A process according to Claim 1 wherein the repulping temperature is between about 40 and 60° C.

8. A process according to Claim 1 wherein the washed adduct is heated to the repulping temperature in step (b)(i) by contacting the adduct with vapors of the organic solvent.

9. A process according to Claim 1 wherein the cooling of the repulping mixture is step (b)(ii) is effected by evaporation of organic solvent from the repulping mixture.

10. A process according to Claim 1 wherein the separation of the powdery adduct from the mineral oil filtrate, the washing of the adduct, the repulping of the adduct, the cooling of the repulping mixture and the separation of the powdery adduct from the repulping mixture are effected by means of a centrifuge.

References Cited

UNITED STATES PATENTS

| | | | |
|---|---|---|---|
| 2,907,708 | 10/1959 | Hoppe et al. | 208—25 |
| 2,917,447 | 12/1959 | Hoppe et al. | 208—25 |
| 3,600,297 | 8/1971 | Franz et al. | 208—25 |

FOREIGN PATENTS

| | | | |
|---|---|---|---|
| 1,105,090 | 4/1959 | Germany | 208—25 |

HERBERT LEVINE, Primary Examiner

U.S. Cl. X.R.

260—96.5 C